US011546757B2

(12) United States Patent
Kunz et al.

(10) Patent No.: US 11,546,757 B2
(45) Date of Patent: Jan. 3, 2023

(54) ENCRYPTING NETWORK SLICE CREDENTIALS USING A PUBLIC KEY

(71) Applicant: Lenovo (Singapore) PTE. LTD., New Tech Park (SG)

(72) Inventors: Andreas Kunz, Ladenburg (DE); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 305 days.

(21) Appl. No.: 16/806,756

(22) Filed: Mar. 2, 2020

(65) Prior Publication Data

US 2020/0280854 A1 Sep. 3, 2020

Related U.S. Application Data

(60) Provisional application No. 62/812,829, filed on Mar. 1, 2019.

(51) Int. Cl.
| | |
|---|---|
| *H04L 9/30* | (2006.01) |
| *H04W 12/06* | (2021.01) |
| *H04L 9/40* | (2022.01) |
| *H04L 9/08* | (2006.01) |
| *H04L 9/32* | (2006.01) |
| *H04W 12/037* | (2021.01) |
| *H04W 12/0431* | (2021.01) |

(52) U.S. Cl.
CPC ............ *H04W 12/06* (2013.01); *H04L 9/083* (2013.01); *H04L 9/0869* (2013.01); *H04L 9/30* (2013.01); *H04L 9/3226* (2013.01); *H04L 63/08* (2013.01); *H04W 12/037* (2021.01); *H04W 12/0431* (2021.01)

(58) Field of Classification Search
CPC combination set(s) only.
See application file for complete search history.

(56) References Cited

U.S. PATENT DOCUMENTS

2020/0137576 A1* 4/2020 Hu .................. H04W 48/18

FOREIGN PATENT DOCUMENTS

WO  2018231125 A1  12/2018

OTHER PUBLICATIONS

3GPP, "3rd Generation Partnership Project; Technical Specification Group Services and System Aspects; Security architecture and procedures for 5G system (Release 15)", 3GPP TS 33.501 V15.3.1, Dec. 2018, pp. 1-181.

(Continued)

*Primary Examiner* — Izunna Okeke
(74) *Attorney, Agent, or Firm* — Kunzler Bean & Adamson

(57) ABSTRACT

Apparatuses, methods, and systems are disclosed for protecting the user identity and credentials. One apparatus includes a processor registers with a mobile communication network using a first set of credentials, the mobile communication network supporting a plurality of network slices. The processor receives a public key for a network slice where slice-specific authentication is required and encrypts a second set of credentials using the public key. Here, the second set of credentials is used for authentication with the network slice. The apparatus includes a transceiver that sends a message to the mobile communication network, the message including the encrypted second set of credentials.

18 Claims, 10 Drawing Sheets

(56) References Cited

OTHER PUBLICATIONS

3GPP, "3rd Generation Partnership Project; Technical Specification Group Services and System Aspects; Security Aspects; Study on Security Aspects of Enhanced Network Slicing (Release 16)", 3GPP TR 33.813 V0.2.0, Feb. 2019, pp. 1-17.
Lenovo, Motorola Mobility, "Privacy for Slice Authentication", 3GPP TSG-SAWG3 Meeting #94Ad-Hoc S3-190867, Mar. 11-15, 2019, pp. 1-2.
3GPP, "3rd Generation Partnership Project; Technical Specification Group Services and System Aspects; Security Aspects; Study on Security Aspects of Enhanced Network Slicing", 3GPP TR 33.813 V0.2.0, Feb. 2019, pp. 1-17.
3GPP, "3rd Generation Partnership Project; Technical Specification Group Services and System Aspects; Study on the security aspects of the next generation system", 3GPP TR 33.899 V1.1.0, Mar. 2017, pp. 1-468.
PCT/IB2020/000196, "Notification of transmittal of the international search report and the written opinion of the international searching authority or the declaration", ISA, Jul. 23, 2020, pp. 1-14.

\* cited by examiner

ENCRYPTING NETWORK SLICE CREDENTIALS USING A PUBLIC KEY

CROSS-REFERENCE TO RELATED APPLICATIONS

This application claims priority to U.S. Provisional Patent Application No. 62/812,829 entitled "Privacy for Network Slice Authentication" and filed on Mar. 1, 2019 for Andreas Kunz and Genadi Velev, which application is incorporated herein by reference.

FIELD

The subject matter disclosed herein relates generally to wireless communications and more particularly relates to privacy aspects for network-slice-specific access authentication and authorization.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Absolute Radio Frequency Channel Number ("ARFCN"), Authentication, Authorization and Accounting ("AAA"), Access and Mobility Management Function ("AMF"), Positive-Acknowledgment ("ACK"), Application Programming Interface ("API"), Authentication Center ("AuC"), Access Stratum ("AS"), Autonomous Uplink ("AUL"), AUL Downlink Feedback Information ("AUL-DFP"), Base Station ("BS"), Binary Phase Shift Keying ("BPSK"), Bandwidth Part ("BWP"), Cipher Key ("CK"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Discontinuous Transmission ("DTX"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), E-UTRA Absolute Radio Frequency Channel Number ("EARFCN"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Integrity Key ("IK"), Internet-of-Things ("IoT"), International Mobile Subscriber Identity ("IMSI"), Key Derivation Function ("KDF"), Licensed Assisted Access ("LAA"), Load Based Equipment ("LBE"), Listen-Before-Talk ("LBT"), Long Term Evolution ("LTE"), Multiple Access ("MA"), Mobility Management ("MM"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Next Hop (NH"), Next Hop Chaining Counter ("NCC"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Cell Identity ("PCI"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tracking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management ("SM"), Session Management Function ("SMF"), Service Provider ("SP"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Sub-carrier Spacing ("SCS"), Supplementary Uplink ("SUL"), Subscriber Identification Module ("SIM"), Tracking Area ("TA"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR"), Uplink Control Information ("UCI"), User Entity/Equipment (Mobile Terminal) ("UE"), the UE Configuration Update ("UCU"), the UE Route Selection Policy ("URSP"), Uplink ("UL"), User Plane ("UP"), Universal Mobile Telecommunications System ("UMTS"), UMTS Subscriber Identification Module ("USIM"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, a core network (e.g., PLMN) may deploy various network slices, each network slice containing network functions optimized for certain network services and/or traffic types. Currently, the access control to Network Slices requires additional authorization and authentication uses a User ID and credentials, different from the 3GPP subscription credentials (e.g. SUPI and credentials used for PLMN access). This additional authorization and authentication takes place after the primary authentication which is still required between the UE and the 5GS for PLMN access authorization and authentication.

BRIEF SUMMARY

Disclosed are procedures for protecting the user identity and credentials. One method of a UE, e.g., for protecting the user identity and credentials, includes registering with a mobile communication network using a first set of credentials, the mobile communication network supporting a plurality of network slices. The method includes receiving a public key for a network slice where slice-specific authentication is required and encrypting a second set of credentials using the public key. Here, the second set of credentials is used for authentication with the network slice. The method includes sending a message to the mobile communication network, the message including the encrypted second set of credentials.

One method of an AMF, e.g., for protecting the user identity and credentials, includes receiving a registration request from a UE, wherein the UE registers with a mobile communication network using a first set of credentials and retrieving a public key for a network slice where slice-specific authentication is required. The second method includes encrypting a second set of credentials using the public key, the second set of credentials used for authentication with the network slice and sending a message to an authentication server, wherein the message includes the encrypted second set of credentials.

One method of a UDM, e.g., for protecting the user identity and credentials, includes providing network exposure services to a third-party service provider, where the third-party service provider operates a slice authentication server. The third method includes receiving a first set of credentials from the third-party service provider. Here, the first set of credentials includes a public key for a network slice where slice-specific authentication is required. Additionally, the third method includes provisioning the public key to an AMF as part of subscription data, wherein the subscription includes the network slice.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
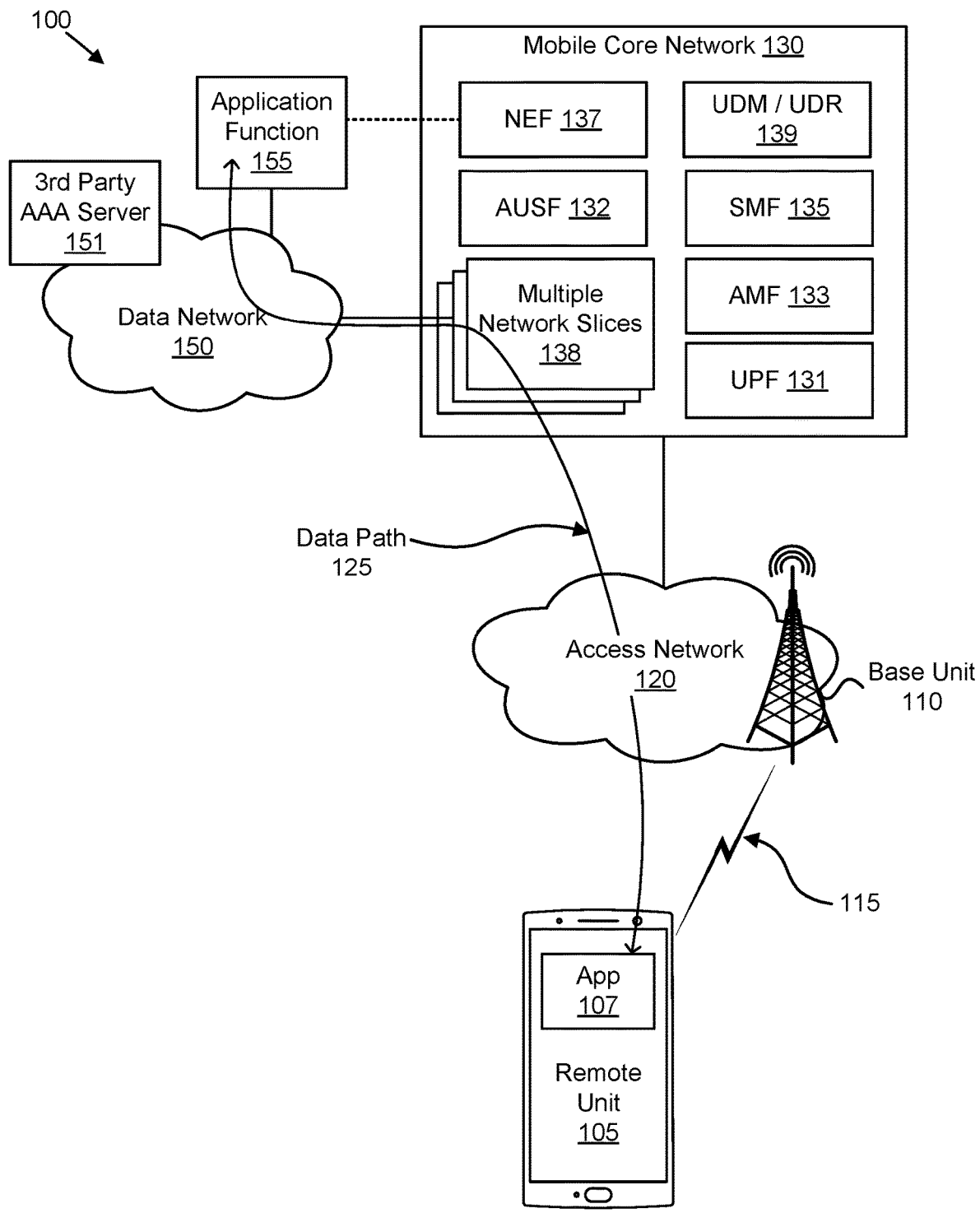
FIG. 1 is a schematic block diagram illustrating one embodiment of a wireless communication system for protecting the user identity and credentials.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Described herein are systems, methods, and apparatus for enhanced privacy during network slice authorization and authentication. As noted above, the current access control to Network Slices requires additional authorization and authentication uses a User ID and credentials, different from the 3GPP subscription credentials. Enhanced privacy is achieved by to protecting the security of the User ID and credentials in UE storage, transmission, and network storage.

During slice-specific authorization and authentication procedures, when the slice authentication is triggered, e.g., with an EAP Identity Request, the answer from the UE is encapsulated within a NAS message. However, the User ID (used for secondary, i.e., slice-specific authentication) in the EAP Identity Response is fully visible to the AMF, which could be in a visited network. Moreover, the Authentication Request message sent from AMF to the slice-specific AAA is not protected at all, such that any traversed node towards the AAA Server may see the User ID.

As the Network Slice Access may be controlled by entities besides the mobile network operator, the user identity and credentials are to be protected during the interaction between the third-party entities and the network functions performing slice authorization and authentication, as well as the interaction between the network functions performing slice authorization and authentication and the related mobile network operator NFs such as AMF, SMF or NSSF.

To protect the security of the User ID and credentials a public key is provided from the service provider to the mobile operator for a given slice identified by an NSSAI. This public key is used to conceal the User ID of the EAP authentication between the UE and the AAA server. In a first solution, the UE conceals the User ID using a public key. In a second solution, a network function (such as AMF) conceals the User ID (e.g., using the public key). These two solutions enhance the privacy of the user ID for slice authentication based on the level of privacy and trust relationship to the visited network in case of roaming.

In various embodiments, a UDM function in the HPLMN retrieves a public key corresponding to a NSSAI for a specific service provider. The UDM also binds the public key to the NSSAI. In various embodiments, provisioning of the public key to the AMF within the subscription profile if the NSSAI is part of subscription. In one embodiment, the public key is provisioned at the first time the NSSAI is requested. In another embodiment, the public key is provisioned every time the NSSAI is requested. In certain embodiments, the public key is provisioned to the AMF only if the UE indicates (e.g., in a Registration Request) that the public key is required. Alternatively, in other embodiments the public key may be provisioned only if the AMF indicates that the public key is required. In some embodiments, the public key is (re)provisioned to the AMF whenever the public key stored in the UDM is changed (e.g., by the service provider).

In various embodiments, an AMF function in the serving network (e.g., a VPLMN) retrieves the public key for a NSSAI within the subscription profile of the UE. In some embodiments, provisioning the public key to the UE occurs with the EAP identity request for slice authentication (e.g., if concealing is done in the UE). In other embodiments, the concealing is done in the AMF. In such embodiments, the AMF conceals the User ID received in the protected NAS message. Here, the AMF may use a Nonce (randomly generated in the AMF) for freshness of concealing the User ID. The AMF provides the concealed user ID in the authentication message to the service provider AAA server, including a nonce, if used for freshness.

In various embodiments, the concealing is done in the UE. Here, the UE may retrieve the public key with the EAP identity request for slice authentication from the AMF. The UE conceals the User ID received in the protected NAS message. In certain embodiments, the UE uses a Nonce (randomly generated in the UE) for freshness of concealing the User ID. In such embodiments, the UE provides the concealed user ID in the authentication message to the service provider AAA server, including a nonce, if used for freshness.

FIG. 1 depicts an embodiment of a wireless communication system 100 for protecting the user identity and credentials, according to various embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the LTE system specified in the 3GPP specifications. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

Each remote unit 105 includes at least one mobile application 108 that can communicate with an application function ("AF") 155 in the data network 150, e.g., via a data path 125. In some embodiments, the data path 125 is the data path of a PDU session established over one of the multiple network slices 138 supported by the mobile core network 130. The specific network slice 138 used by the PDU session may be determined by the S-NSSAI attribute of the PDU session. Here, the remote unit 105 may be provisioned with Network Slice Selection Policy ("NSSP") rules which it uses to determine how to route the traffic of the mobile application 108. The mobile application 108 in the remote unit 105 may also communicate with other application functions 155. While a specific number of mobile applications 108 and application functions 155 are depicted in FIG. 1, one of skill in the art will recognize that any number of mobile applications 108 may be included in the remote unit 105 and any number of application functions 155 may be included in the wireless communication system 100.

The base units 110 may be distributed over a geographic region. In certain embodiments, a base unit 110 may also be referred to as an access terminal, a base, a base station, a Node-B, an eNB, a gNB, a Home Node-B, a relay node, a femtocell, an access point, a device, or by any other terminology used in the art. The base units 110 are generally part of an access network 120, such as a radio access network ("RAN"), that may include one or more controllers communicably coupled to one or more corresponding base units 110. These and other elements of the access network 120 are not illustrated but are well known generally by those having ordinary skill in the art. The base units 110 connect to the mobile core network 130 via the access network 120. The access network 120 and mobile core network 130 may be collectively referred to herein as a "mobile network" or "mobile communication network."

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC"), which may be coupled to a data network 150, like the Internet and private data networks, among other data networks. In some embodiments, the remote units 105 communicate with an application function ("AF") 155 (external to the mobile core network 130) via a network connection with the mobile core network 130. Each mobile core network 130 belongs to a single public land mobile network ("PLMN"). The present disclosure is not intended to be limited to the implementation of any particular wireless communication system architecture or protocol. For example, other embodiments of the mobile core network 130 include an enhanced packet core ("EPC") or a Multi-Service Core as describe by the Broadband Forum ("BBF").

The mobile core network 130 includes several network functions ("NFs") and multiple network slices 138. As depicted, the mobile core network 130 includes at least one user plane function ("UPF") 131, at least one access and mobility management function ("AMF") 133, at least one session management function ("SMF") 135, at least one Authentication Server Function ("AUSF") 132, and at least one unified data management function with an internal user data repository ("UDM/UDR") 139. In certain embodiments, the mobile core network 130 also includes at least one network exposure function ("NEF") 137. Although a specific number of NFs are depicted in FIG. 1, one of skill in the art will recognize that any number of NFs may be included in the mobile core network 130.

The UDM/UDR 139 comprises a Unified Data Management ("UDM") and its internal component User Data Repository ("UDR"). The UDR holds subscription data including policy data. Specifically, the policy data stored by the UDM/UDR 139 includes the NSSP. The UDM/UDR 139, AUSF 132, AMF 133, and SMF 135 are examples of control plane network functions of the mobile core network 130. Control plane network functions provide services such as UE registration, UE connection management, UE mobility management, session management, and the like. In contrast, a user-plane function (UPF 131) provides data transport services to the remote units 105.

The NEF 137 implements a "front end" service that interfaces with external application functions and exposes to these functions the capabilities of the mobile core network. For example, the NEF 137 can be used by an AF 155 to communicate with the UDM/UDR 139, for example to provision network slice authentication information as described herein. Thus, the NEF 137 provides a single point of contact for external applications that want to utilize the services offered by the internal network functions of the mobile network (e.g., services of the AMF 133, AUSF 132, UDM/UDR 139, SMF 135, etc.).

The multiple network slices 138 are logical networks within the mobile core network 130. The network slices 138 are partitions of resources and/or services of the mobile core network 130. Different network slices 138 may be used to meet different service needs (e.g., latency, reliability, and capacity). Examples of different types of network slices 138 include enhanced mobile broadband ("eMBB"), massive machine-type communication ("mMTC"), and ultra-reliability and low latency communications ("URLLC"). A mobile core network 130 may include multiple network slice instances of the same network slice type. Different network slice instance of the same type may be distinguished by a slice "tenant" (also known as "slice differentiator") associated with the instance. Each network slice is identified using a S-NSSAI, while the set of network slices requested by the remote unit 105 and/or approved by the mobile core network 130 is referred to as NSSAI.

As discussed above, a mobile application 107 running on the remote unit 105 communicates with the AF 155 via the data path 125 that passes through a network slice 138 of the mobile core network. Additionally, the AF 155 may send information to the mobile core network 130 which can be used to optimize the network internal configuration or network behavior. In certain embodiments, the AF 155 is an application server ("AS") or a service capability server ("SCS") enabling a mobile application 108 to access and use functionality provided by the server over standardized interfaces (e.g., APIs).

The wireless communication system 100 is capable of authenticating users to a network slice, specifically providing network slice access authentication and authorization using user identities and credentials different from the 3GPP SUPI, as described above. In various embodiments, the wireless communication system 100 includes a third-party AAA server 151 for that performs authentication/authorization for certain network slice (e.g., NSSAI controlled by a third-party service provider). Moreover, the wireless communication system 100 protecting the user identity and credentials using a public key corresponding to the network slice.

While FIG. 1 depicts components of a 5G RAN and a 5G core network, the described embodiments for protecting the user identity and credentials apply to other types of communication networks, including IEEE 802.11 variants, GSM, GPRS, UMTS, LTE variants, CDMA 2000, Bluetooth, ZigBee, Sigfoxx, and the like. For example, in an LTE variant involving an EPC, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

Figure 2A:
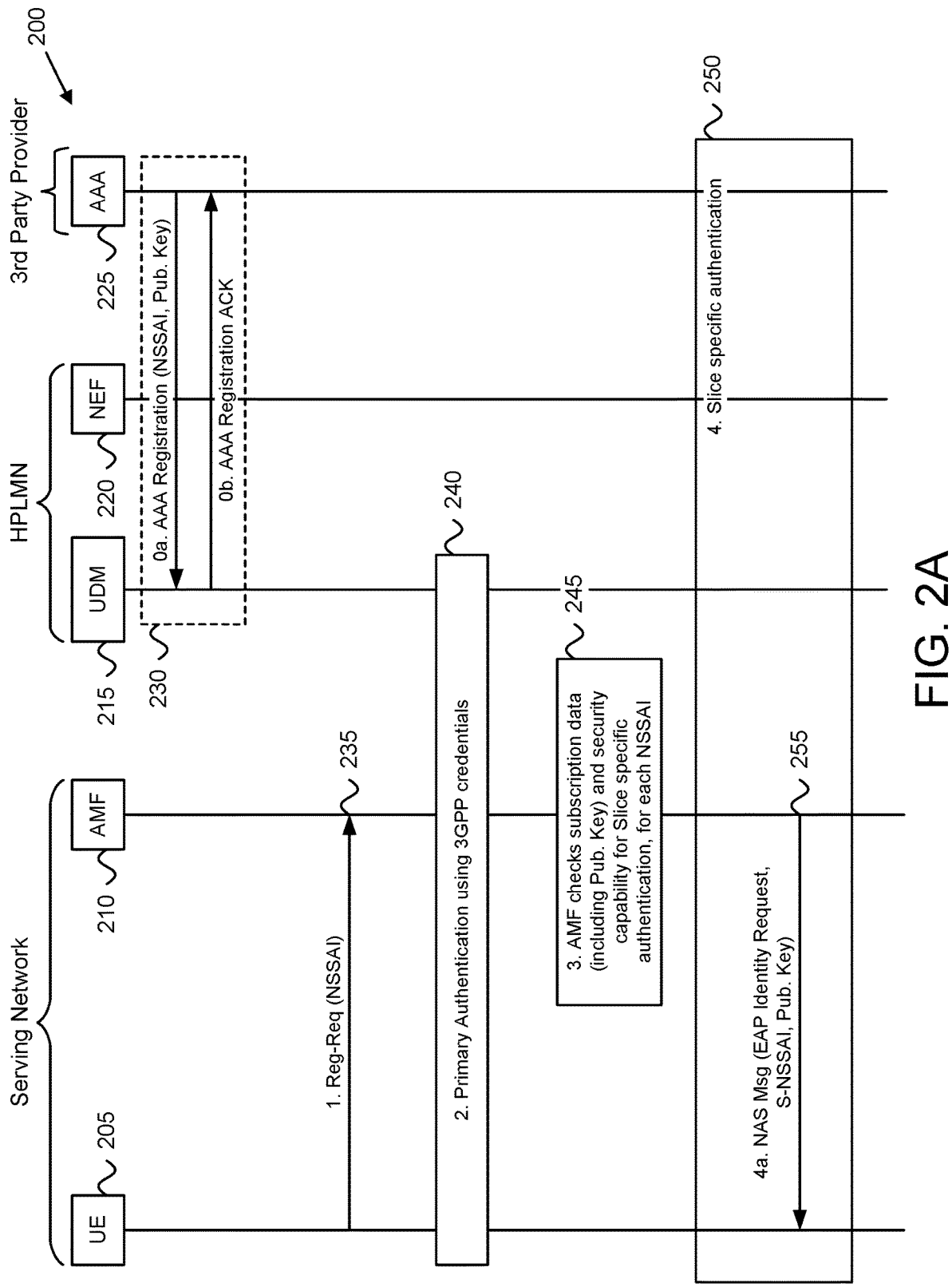
FIG. 2A is a call flow diagram illustrating one embodiment of concealing the User ID during network slice authorization and authentication.

FIG. 2A depicts a call flow 200 for protecting the user identity and credentials, according to embodiments of the disclosure. The call flow 200 illustrates a UE 205 concealing the User ID during network slice authorization and authentication (i.e., slice-specific authentication). The call flow 200 involves the UE 205, an AMF 210 in a serving network, a UDM 215 in a home PLMN, a NEF 220 in the home PLMN, and an AAA server 225 of the third-party provider located outside the H-PLMN. Here, the UE 205 is one embodiment of the remote unit 105 and the AMF 210 may be one embodiment of the AMF 133. Note, however, that the AMF 210 may be located in a V-PLMN (i.e., when the UE 205 is roaming) or in the H-PLMN. The UDM 215 is one embodiment of the UDM/UDR 139. The AAA server 225 is one embodiment of the third-party AAA server 151.

In the call flow 200, the User ID is not to be visible to the AMF 210 in the visited network nor to the home network (in case of a local AAA proxy) nor to any other network function the message is traversing on its way to the AAA server 225. Consequently, the UE 205 is provisioned with a public key of the third-party service provider, operating the offered service which requires the network slice specific authentication and authorization by AAA server 225. The UE 205 may be provisioned with such a public key of the third-party service provider during the service provisioning process when User ID and credentials for network slice-specific secondary authentication. For example, this can be performed when the UE 205 registers with the application server (or service provider) for the particular service.

Additionally, the UE 205 may be provisioned with the public key (but also with the User ID and credentials for network slice-specific secondary authentication) of the third-party service provider during a NAS procedure. The public key (but also with the User ID and credentials for network slice-specific secondary authentication) of the third-party service provider can be sent from the external third-party via the 5GS/EPS control plane to be provisioned to the UE 205.

Optionally, the UE 205 may indicate with a flag in the Registration Request that it requires a new key for a specific NSSAI (not stored in the ME or UICC/USIM anymore, e.g. due to SIM card swapping to another phone). For example, the public key can be provisioned via the NEF 220 to the UDM 215 for a specific NSSAI (see, e.g., step 0). There may be other ways of provisioning the public key and corresponding NSSAI. The UDM 215 connects the subscriptions for a particular NSSAI with the public key.

Once the UE 205 is authenticated and NAS SMC is performed, the public key of a subscribed NSSAI is provisioned with the subscription data to the AMF 210. This provisioning of the Public Key to the AMF 210 may be performed every time or only at the first time the UE 205 is requesting service for this NSSAI or when the UE 205 is requesting it explicitly in the Registration Request or when the third-party service provider updated/changed the public key in the UDM 215 for this NSSAI.

In the following it is assumed that the AMF 210 provides the new/update public key to the UE 205. However, there may be other ways of provisioning the public key to the UE 205, e.g., over the top when the UE 205 subscribes to the service via a web interface.

At Step 0, the AAA server 225 registers with the UDM 215 via the NEF 220 and the UDM 215 sends an acknowledgement back to the AAA server 225 (e.g., upon successful AAA registration, see messaging 230). Note that the AAA server 225 registers for a particular NSSAI and provisions the UDM 215 with the public key corresponding to the NSSAI. As noted above, the UDM 215 binds the public key to the NSSAI.

At Step 1, the UE 205 sends a registration request to the AMF 210 which includes an NSSAI (see messaging 235). This message initiates registration and primary authentication with the H-PLMN. Here, the registration request is for primary authentication and relates to the mobile service subscription the UE 205 has with the H-PLMN.

At Step 2, UE 205 performs primary authentication and security mode command ("SMC"), here involving the AMF 210 and UDM 215 (see block 240).

At Step 3, the AMF 210 retrieves the subscription data for the UE 205 from the UDM 215, including the public key for each NSSAI where slice authentication is required (see block 245). Here, the AMF 210 may check the UE subscription data to determine whether slice authentication is required for the NSSAI.

At Step 4, the UE 205 and AAA server 225 perform slice-specific authentication (see block 250). In Step 4a, the AMF 210 initiates the slice authentication and sends an EAP Identity Request to the UE 205 (see messaging 255). Here, the AMF 210 sends to the UE 205 the S-NSSAI, and may also send the corresponding public key.

Figure 2B:
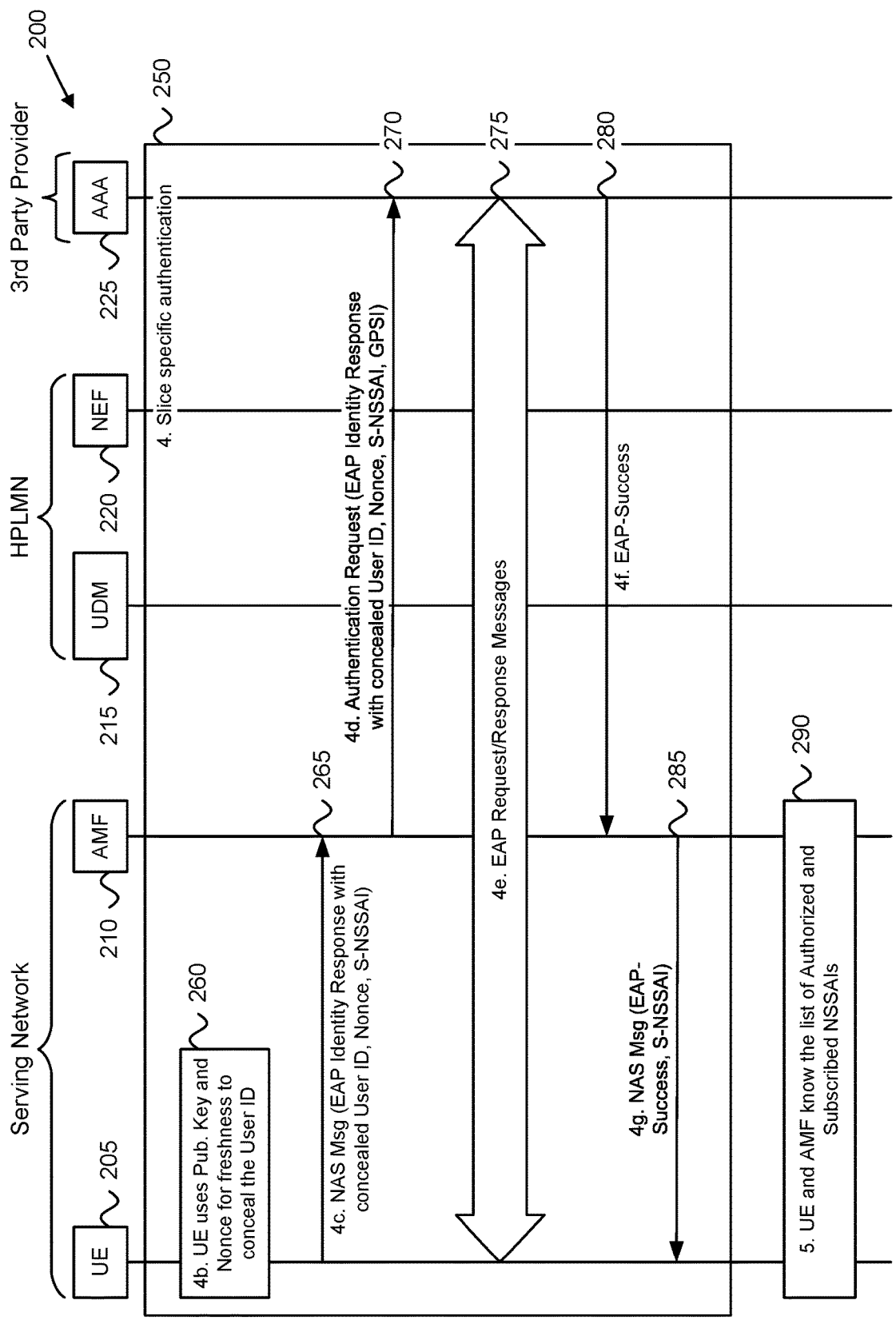
FIG. 2B is a continuation of the call flow of FIG. 2A.

Continuing at FIG. 2B, in Step 4b, the UE 205 stores the public key either in the ME or in the tamperproof hardware, e.g. UICC, ETSI SSP, etc., and binds it with the S-NSSAI (see block 260). The UE 205 uses the Public Key to encrypt the User ID for the S-NSSAI and may use a Nonce for freshness, i.e., the encrypted User ID would be different each time. Note that the Nonce may be randomly generated in the UE 205.

At Step 4c, the UE 205 sends the NAS message with the EAP Identity Response with the concealed User ID and, if used, the Nonce for freshness (see messaging 265). At Step 4d, the AMF 210 sends an Authentication Request with the concealed User ID and, if used, the Nonce for freshness to the AAA server 225 (see messaging 270). The AAA server 225 has the corresponding private key and is able to de-conceal the User ID and to start the related EAP message exchange for authentication of this User ID. Due to the nature to public-private key pairs, only the holder of the corresponding private key is able to decrypt the User ID.

At Step 4e, the UE 205 and AAA server exchange additional EAP messages to authenticate the User ID (see messaging 275). In Step 4f, once the secondary (slice-specific) authentication is successful, the AAA server 225 sends an EAP-success message to the AMF 210 (see messaging 280). In Step 4g, the AMF 210 sends the EAP-Success message to the UE 205, along with the associated S-NSSAI (see messaging 285).

At Step 5, the slice-specific authentication 250 is complete, and the UE 205 and AMF 210 know the list of Authorized and Subscribed NSSAIs (see block 290).

Figure 3A:
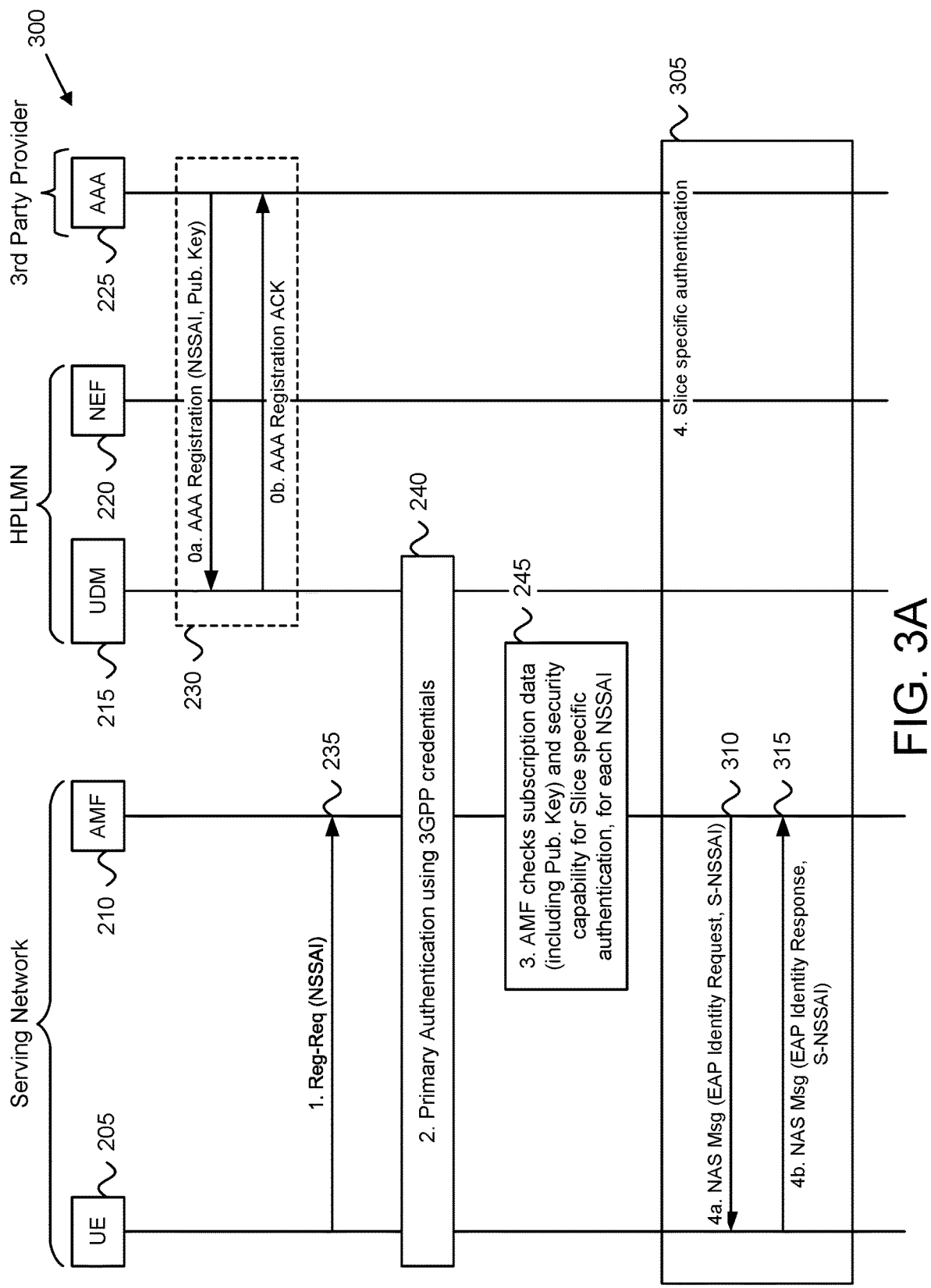
FIG. 3A is a call flow diagram illustrating another embodiment of concealing the User ID during network slice authorization and authentication.
Figure 3B:
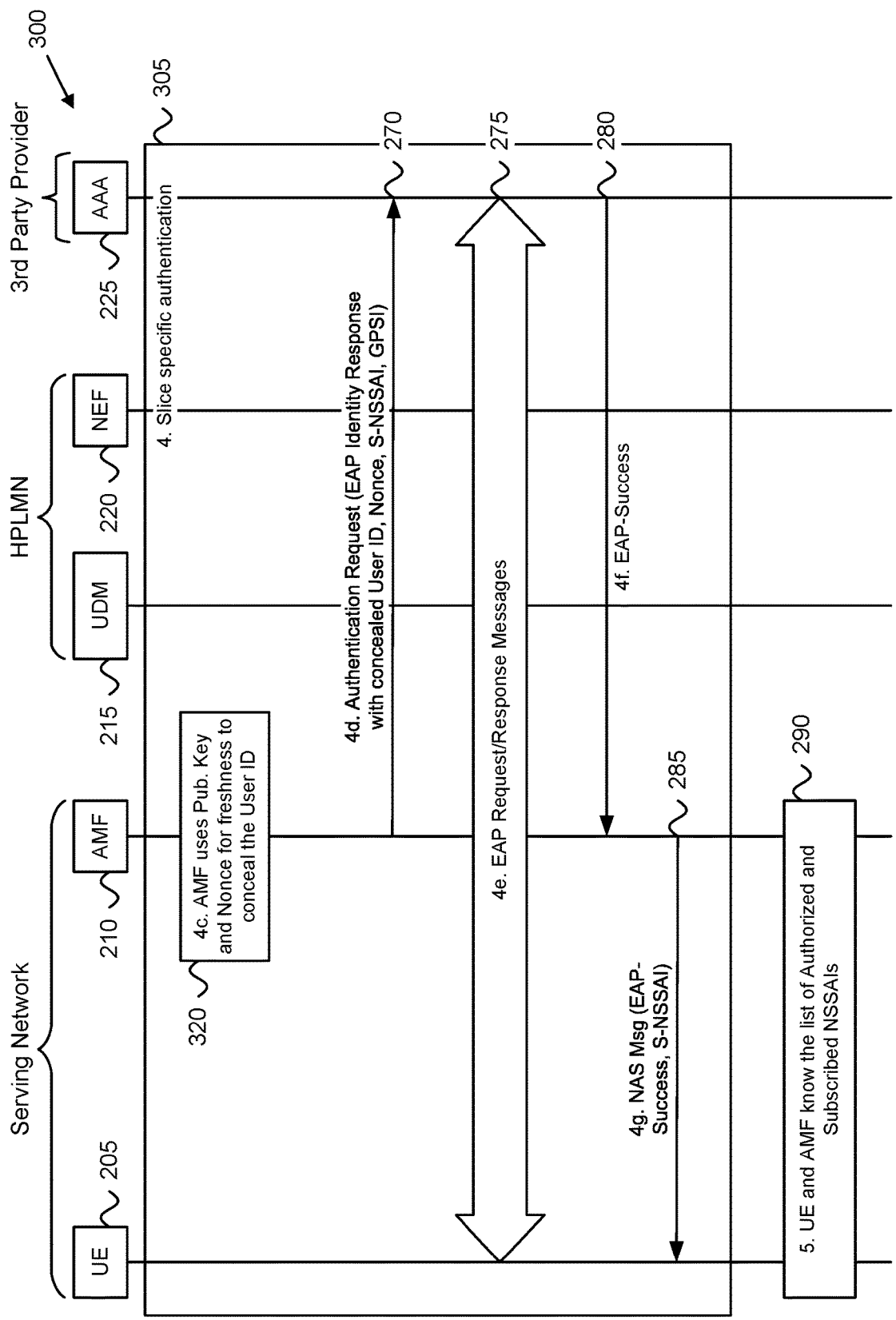
FIG. 3B is a continuation of the call flow of FIG. 3A.

FIGS. 3A-3B depict a call flow 300 for protecting the user identity and credentials, according to embodiments of the disclosure. The call flow 300 illustrates the AMF 210 concealing the User ID during network slice authorization and authentication (i.e., slice-specific authentication). The call flow 300 involves the UE 205, an AMF 210 in a serving network, a UDM 215 in a home PLMN, a NEF 220 in the home PLMN, and an AAA server 225 of the third-party provider located outside the H-PLMN.

In the call flow 300 the User ID is visible to the AMF 210 in the visited network but should be protected to any other network function the message is traversing on its way to the AAA server 225. Consequently, the AMF 210 is provisioned with a public key of the third-party service provider, operating the slice authentication AAA server 225. The AMF 210 may indicate with a flag to the UDM 215 that it requires a new key for a specific NSSAI for this UE 205 (e.g. not stored anymore).

The public key can be provisioned via the NEF 220 to the UDM 215 for a specific NSSAI. There may be other ways of provisioning the public key and corresponding NSSAI. The UDM connects the subscriptions for a particular NSSAI with the public key. Once the UE 205 is authenticated and NAS SMC is performed, the public key of a subscribed NSSAI is provisioned with the subscription data to the AMF 210. As noted above, this provisioning of the Public Key to the AMF 210 may be performed every time or less often.

In the scenario of FIGS. 3A-3B, the AMF 210 is capable to securely store the public key and to bind it to the corresponding NSSAI. The AMF 210 may store all public keys for all NSSAIs that require slice authentication. However, in case where the AMF 210 does not have any specific storage for public keys, the UDM 215 may send the public key for each NSSAI for every UE 205 to the AMF 210. In various embodiments, the UDM 215 always sends the public key for each NSSAI for every roaming UE 205 to the AMF 210.

At Step 0, the AAA server 225 registers with the UDM 215 via the NEF 220 and the UDM 215 sends an acknowledgement back to the AAA server 225 (e.g., upon successful AAA registration, see messaging 230). Note that the AAA server 225 registers for a particular NSSAI and provisions the UDM 215 with the public key corresponding to the NSSAI. As noted above, the UDM 215 binds the public key to the NSSAI.

At Step 1, the UE 205 sends a registration request to the AMF 210 which includes an NSSAI (see messaging 235). This message initiates registration and primary authentication with the H-PLMN. Here, the registration request is for primary authentication and relates to the mobile service subscription the UE 205 has with the H-PLMN.

At Step 2, UE 205 performs primary authentication and security mode command ("SMC"), here involving the AMF 210 and UDM 215 (see block 240).

At Step 3, the AMF 210 retrieves the subscription data for the UE 205 from the UDM 215, including the public key for each NSSAI where slice authentication is required (see block 245). Here, the AMF 210 may check the UE subscription data to determine whether slice authentication is required for the NSSAI.

At Step 4, the UE 205 and AAA server 225 perform slice-specific authentication (see block 305). In Step 4a, the AMF 210 initiates the slice authentication and sends an EAP Identity Request to the UE 205 (see messaging 310). Here, the AMF 210 sends to the UE 205 the S-NSSAI. However, the AMF 210 does not send the Public Key to the UE 205 because in the call flow 300 it is the AMF 210 that conceals the User ID. In Step 4b, the UE 205 sends the NAS message with the EAP Identity Response (see messaging 315).

Continuing at FIG. 3B, in Step 4c the AMF 210 uses the Public Key to encrypt the User ID for the S-NSSAI and may use a Nonce for freshness, i.e., the encrypted User ID would be different each time (see block 320). The Nonce may be randomly generated in the AMF 210.

At Step 4d, the AMF 210 sends an Authentication Request with the concealed User ID and, if used, the Nonce for freshness to the AAA server 225 (see messaging 270). The AAA server 225 has the corresponding private key and is able to de-conceal the User ID and to start the related EAP message exchange for authentication of this User ID. Due to the nature to public-private key pairs, only the holder of the corresponding private key is able to decrypt the User ID.

At Step 4e, the UE 205 and AAA server exchange additional EAP messages to authenticate the User ID (see messaging 275). In Step 4f, once the secondary (slice-specific) authentication is successful, the AAA server 225 sends an EAP-success message to the AMF 210 (see messaging 280). In Step 4g, the AMF 210 sends the EAP-Success message to the UE 205, along with the associated S-NSSAI (see messaging 285).

At Step 5, the slice-specific authentication 305 is complete and the UE 205 and AMF 210 know the list of Authorized and Subscribed NSSAIs (see block 290).

Figure 4:
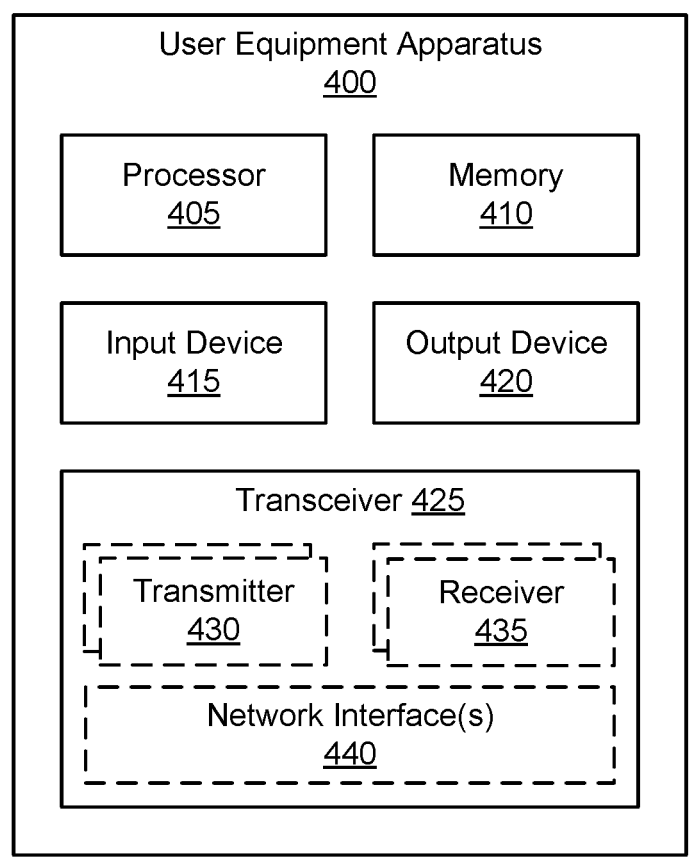
FIG. 4 is a diagram illustrating one embodiment of a user equipment apparatus that may be used for protecting the user identity and credentials.

FIG. 4 depicts a user equipment apparatus 400 that may be used for protecting the user identity and credentials, according to embodiments of the disclosure. In various embodiments, the user equipment apparatus 400 is used to implement one or more of the solutions described above. The user equipment apparatus 400 may be one embodiment of the remote unit 105 and/or UE, described above. Furthermore, the user equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 registers with a mobile communication network using a first set of credentials, the mobile communication network supporting a plurality of network slices. The processor 405 receives a public key for a network slice where slice-specific authentication is required and encrypts a second set of credentials using the public key. Here, the second set of credentials is used for authentication with the network slice. The transceiver 425 sends a message to the mobile communication network, the message including the encrypted second set of credentials.

In some embodiments, the processor 405 generates a nonce when encrypting the second set of credentials. Here, the nonce is used in the encryption process. In such embodiments, the message to the mobile communication network may include the nonce. In various embodiments, the message to the mobile communication network initiates slice-specific authentication of the user equipment apparatus 400.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to protecting the user identity and credentials. For example, the memory 410 may store UE subscription credentials, public keys, nonces, bindings of keys to NSSAI, and the like. In certain embodiments, the memory 410 also stores program code and related data, such as an operating system or other controller algorithms operating on the user equipment apparatus 400.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. Additionally, the transceiver 425 may support at least one network interface 440. Here, the at least one network interface 440 facilitates communication with a RAN node, such as an eNB or gNB, for example using the "Uu" interface. Additionally, the at least one network interface 440 may include an interface used for communications with one or more network functions in the mobile core network, such as a UPF, an AMF, and/or a SMF.

In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an application-specific integrated circuit ("ASIC"), or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
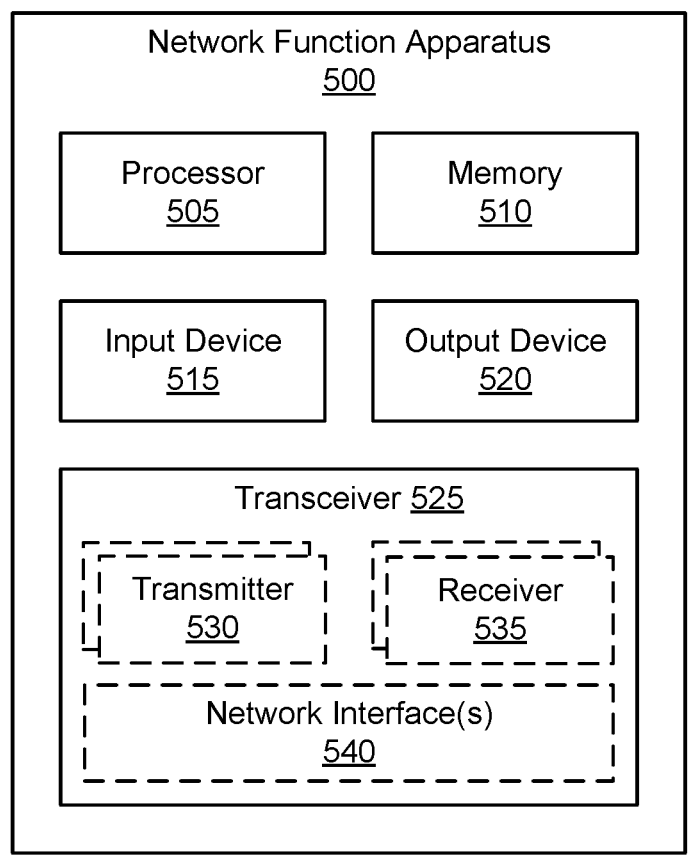
FIG. 5 is a diagram illustrating one embodiment of a network function apparatus that may be used for protecting the user identity and credentials.

FIG. 5 depicts a network function apparatus 500 that may be used for protecting the user identity and credentials, according to embodiments of the disclosure. In various embodiments, the network function apparatus 500 is used to implement one or more of the solutions described above. The network function apparatus 500 may be one embodiment of the AMF, described above. Furthermore, the network function apparatus 500 may include a processor 505, a memory 510, an input device 515, an output device 520, and a transceiver 525. In some embodiments, the input device 515 and the output device 520 are combined into a single device, such as a touchscreen. In certain embodiments, the network function apparatus 500 may not include any input device 515 and/or output device 520. In various embodiments, the network function apparatus 500 may include one or more of: the processor 505, the memory 510, and the transceiver 525, and may not include the input device 515 and/or the output device 520.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the network function apparatus 500 is an AMF in a core network. In such embodiments, the transceiver 525 receives a registration request from a UE, wherein the UE registers with a mobile communication network (e.g., core network) using a first set of credentials. The processor 505 retrieves a public key for a network slice where slice-specific authentication is required and encrypts a second set of credentials using the public key, the second set of credentials used for authentication with the network slice. Additionally, the processor 505 controls the transceiver 525 to send a message to an authentication server, the message including the encrypted second set of credentials.

In some embodiments, the first set of credentials is received from a UDM. In certain embodiments, the first set of credentials is received together with the subscription data of the UE. Here, the first set of credentials includes the public key.

In some embodiments, the second set of credentials is received from the UE. In some embodiments, the processor 505 generates a nonce when encrypting the second set of credentials comprises, wherein the nonce is used in the encryption process. In such embodiments, the message to the authentication server may include the nonce.

In some embodiments, the processor 505 checks subscription data of the UE in response to the registration request, wherein the public key is stored with the subscription data. In various embodiments, the message to the authentication server initiates slice-specific authentication of the UE.

In various embodiments, the network function apparatus 500 is an UDM in a core network. In such embodiments, the processor 505 provides network exposure services to a third-party service provider, where the third-party service provider operates a slice authentication server (e.g., AAA server). The transceiver 525 receives a first set of credentials from the third-party service provider. Here, the first set of credentials includes a public key for a network slice where slice-specific authentication is required.

Additionally, the processor 505 provisions the public key to an AMF as part of subscription data, wherein the subscription includes the network slice. In some embodiments, the first set of credentials is received via a NEF.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to protecting the user identity and credentials. For example, the memory 510 may store subscription profiles, UE subscription credentials, public keys, nonces, bindings of keys to NSSAI, and the like. In certain embodiments, the memory 510 also stores program code and related data, such as an operating system or other controller algorithms operating on the network function apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the network function apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to send messages to the RAN, as described herein. Similarly, one or more receivers 535 may be used to receive messages from the RAN, as described herein. Although only one transmitter 530 and one receiver 535 are illustrated, the network function apparatus 500 may have any suitable number of transmitters 530 and receivers 535. Further, the transmitter(s) 525 and the receiver(s) 530 may be any suitable type of transmitters and receivers.

In various embodiments, the transceiver 525 supports one or more network interfaces 540 for communicating with a UE and/or network function. For example, when the network function apparatus 500 operates as an AMF, the transceiver 525 may support an N1 (logical) interface between UE and AMF. Additionally, the transceiver 525 may support various 5GC service interface, such as the Namf interface and/or Nudm interface.

Figure 6:
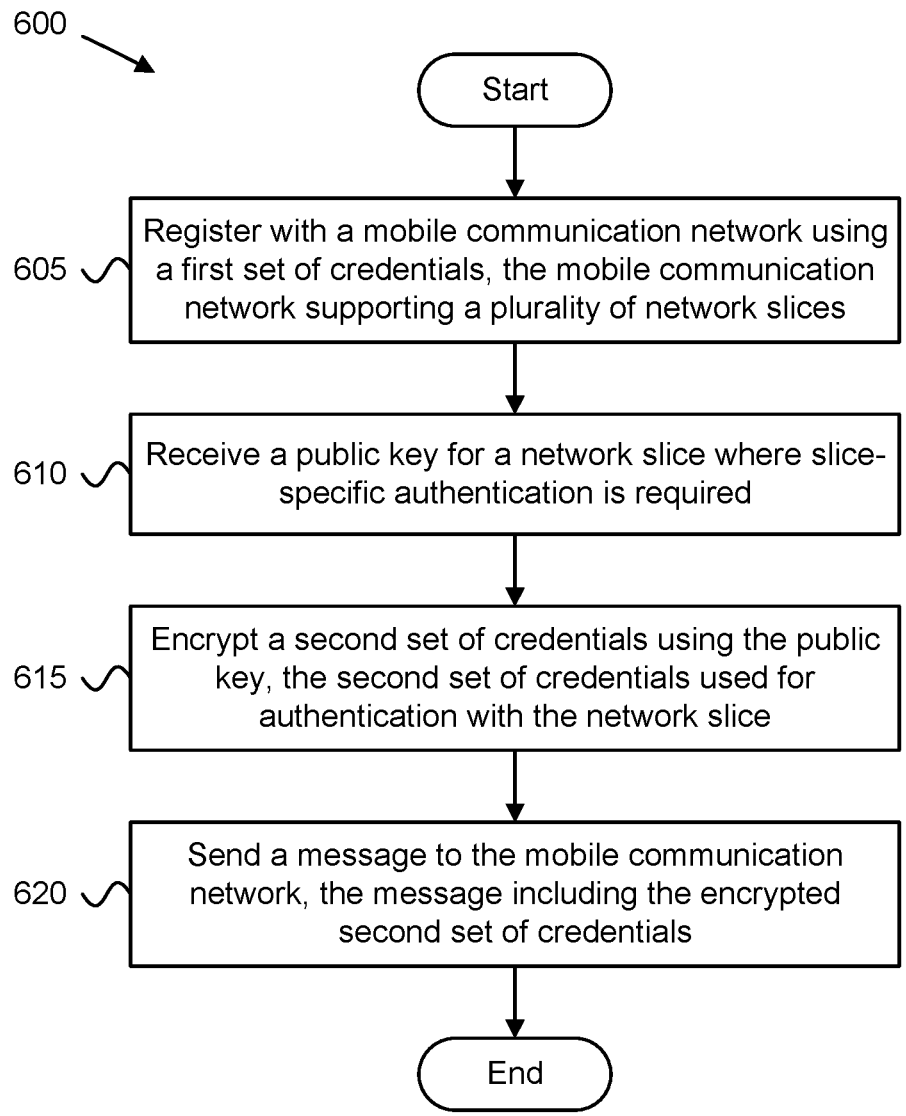
FIG. 6 is a flowchart diagram illustrating one embodiment of a method that may be used for protecting the user identity and credentials.

FIG. 6 depicts one embodiment of a method 600 for protecting the user identity and credentials, according to embodiments of the disclosure. In various embodiments, the method 600 is performed by a UE, such as the remote unit 105, UE 205, and/or user equipment apparatus 400, described above. In some embodiments, the method 600 is performed by a processor, such as a microcontroller, a microprocessor, a CPU, a GPU, an auxiliary processing unit, a FPGA, or the like.

The method 600 begins and registers 605 with a mobile communication network using a first set of credentials, the mobile communication network supporting a plurality of network slices. The method 600 includes receiving 610 a public key for a network slice where slice-specific authentication is required.

The method 600 includes encrypting 615 a second set of credentials using the public key. Here, the second set of credentials is used for authentication with the network slice. The method 600 includes sending 620 a message to the mobile communication network, the message including the encrypted second set of credentials. The method 600 ends.

Figure 7:
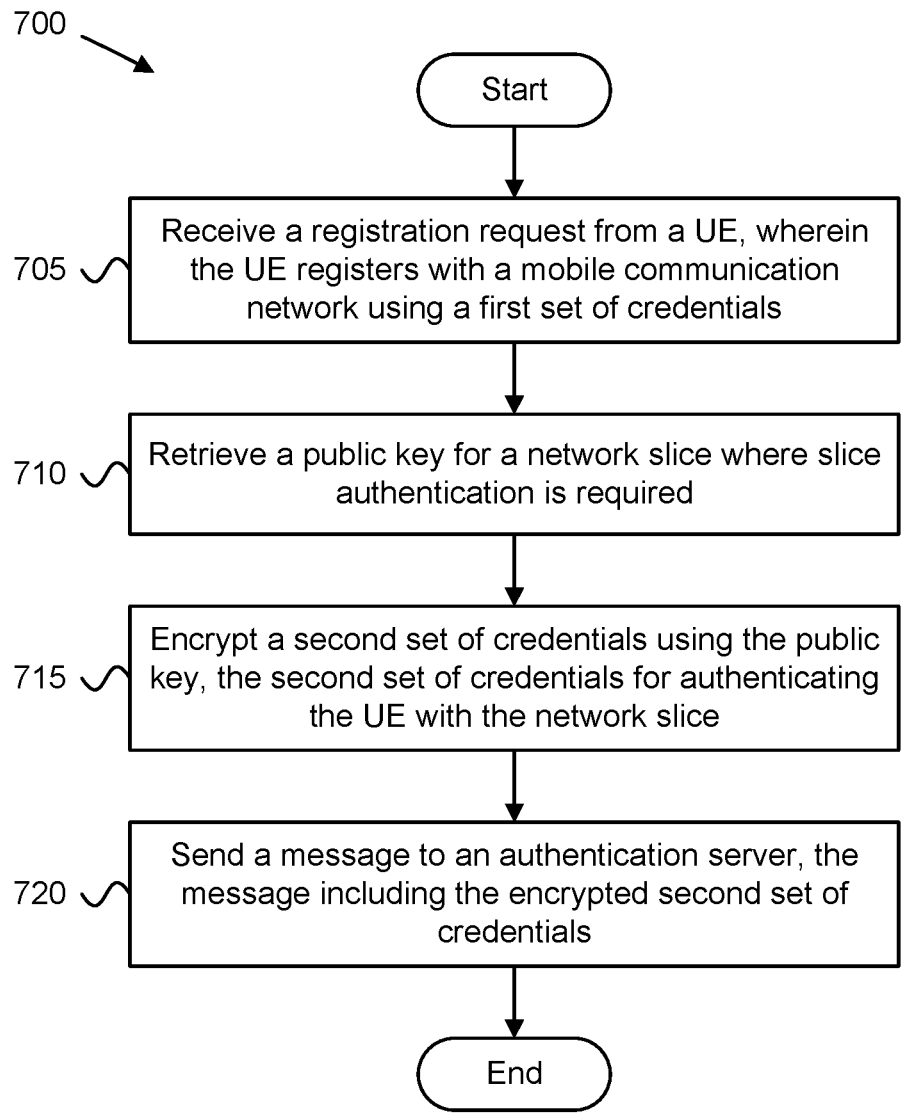
FIG. 7 is a flowchart diagram illustrating another embodiment of a method that may be used for protecting the user identity and credentials.

FIG. 7 depicts one embodiment of a method 700 for protecting the user identity and credentials, according to embodiments of the disclosure. In various embodiments, the method 700 is performed by an AMF, such as the AMF 133, the AMF 210, and/or the network function apparatus 500, described above. In some embodiments, the method 700 is performed by a processor, such as a microcontroller, a microprocessor, a CPU, a GPU, an auxiliary processing unit, a FPGA, or the like.

The method 700 begins and receives 705 a registration request from a UE, wherein the UE registers with a mobile communication network (e.g., core network) using a first set of credentials. The method 700 includes retrieving 710 a public key for a network slice where slice-specific authentication is required.

The method 700 includes encrypting 715 a second set of credentials using the public key, the second set of credentials used for authentication with the network slice. The method 700 includes sending 720 a message to an authentication server, wherein the message includes the encrypted second set of credentials. The method 700 ends.

Figure 8:
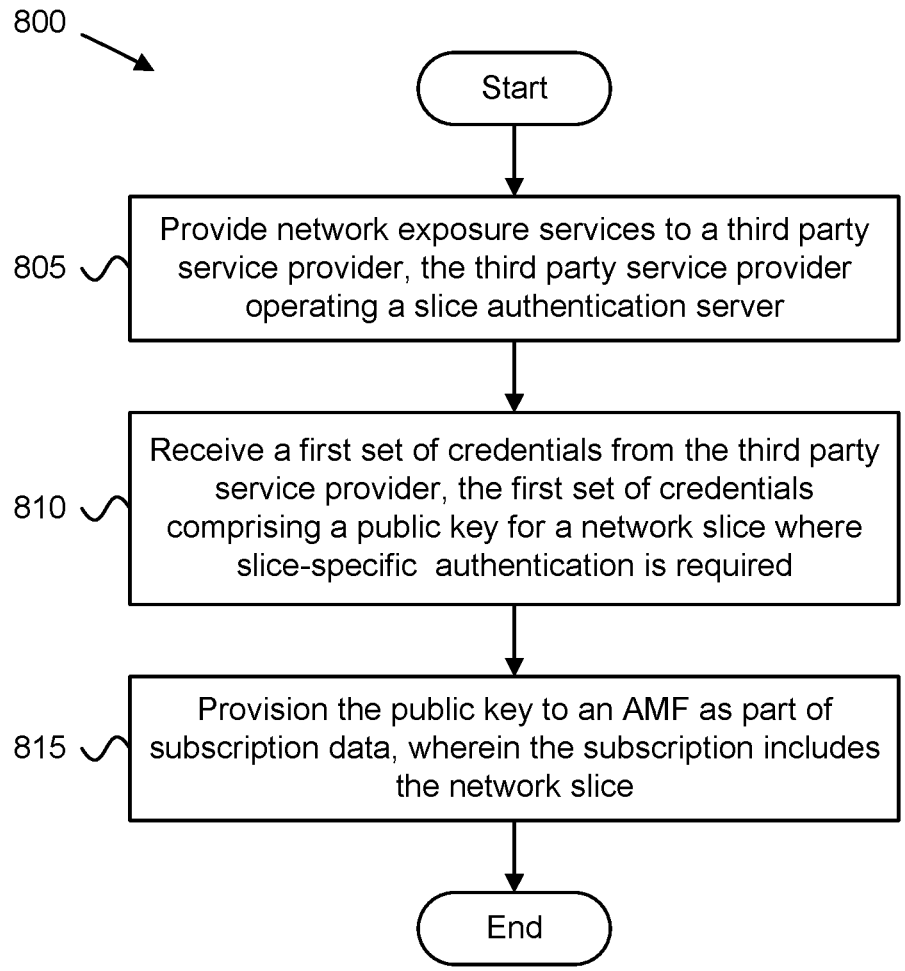
FIG. 8 is a flowchart diagram illustrating another embodiment of a method that may be used for protecting the user identity and credentials.

FIG. 8 depicts one embodiment of a method 800 for protecting the user identity and credentials, according to embodiments of the disclosure. In various embodiments, the method 800 is performed by a UDM, such as the UDM/UDR 139, the UDM 215, and/or the network function apparatus 500, described above. In some embodiments, the method 800 is performed by a processor, such as a microcontroller, a microprocessor, a CPU, a GPU, an auxiliary processing unit, a FPGA, or the like.

The method 800 begins and providing 805 network exposure services to a third-party service provider, where the third-party service provider operates a slice authentication server (e.g., AAA server). The method 800 includes receiving 810 a first set of credentials from the third-party service provider. Here, the first set of credentials includes a public key for a network slice where slice-specific authentication is required. The method 800 includes provisioning 815 the public key to an AMF as part of subscription data, wherein the subscription includes the network slice. The method 800 ends.

Disclosed herein is a first apparatus for managing uplink preemption, according to embodiments of the disclosure. The first apparatus may be implemented by a UE, such as the remote unit 105, the UE 205, and/or the user equipment apparatus 400. The first apparatus includes a processor that registers with a mobile communication network using a first set of credentials, the mobile communication network supporting a plurality of network slices. The processor receives a public key for a network slice where slice-specific authentication is required and encrypts a second set of credentials using the public key. Here, the second set of credentials is used for authentication with the network slice. The transceiver sends a message to the mobile communication network, the message including the encrypted second set of credentials.

In some embodiments, the processor generates a nonce when encrypting the second set of credentials. Here, the nonce is used to encrypt the second set of credentials. In such embodiments, the message to the mobile communication network may include the nonce. In various embodiments, the message to the mobile communication network initiates slice-specific authentication of the apparatus.

Disclosed herein is a first method for managing uplink preemption, according to embodiments of the disclosure. The first method may be performed by a UE, such as the remote unit 105, the UE 205, and/or the user equipment apparatus 400. The first method includes registering with a mobile communication network using a first set of credentials, the mobile communication network supporting a plurality of network slices. The first method includes receiving a public key for a network slice where slice-specific authentication is required and encrypting a second set of credentials using the public key. Here, the second set of credentials is used for authentication with the network slice. The first method includes sending a message to the mobile communication network, the message including the encrypted second set of credentials.

In some embodiments, encrypting the second set of credentials includes generating a nonce. Here, the nonce is used to encrypt the second set of credentials. In such embodiments, the message to the mobile communication network may include the nonce. In various embodiments, the message to the mobile communication network initiates slice-specific authentication of the apparatus.

Disclosed herein is a second apparatus for managing uplink preemption, according to embodiments of the disclosure. The second apparatus may be implemented by an AMF, such as the AMF 133, the AMF 210, and/or the network function apparatus 500. The second apparatus includes a transceiver that receives a registration request from a UE, wherein the UE registers with a mobile communication network (e.g., core network) using a first set of credentials. The second apparatus includes a processor that retrieves a public key for a network slice where slice-specific authentication is required and encrypts a second set of credentials using the public key, the second set of credentials used for authentication with the network slice. Additionally, the processor controls the transceiver to send a message to an authentication server, the message including the encrypted second set of credentials.

In some embodiments, the first set of credentials is received from a UDM. In certain embodiments, the first set of credentials is received together with the subscription data of the UE. Here, the first set of credentials includes the public key.

In some embodiments, the second set of credentials is received from the UE. In some embodiments, the processor generates a nonce when encrypting the second set of credentials comprises, wherein the nonce is used to encrypt the second set of credentials. In such embodiments, the message to the authentication server may include the nonce.

In some embodiments, the processor checks subscription data of the UE in response to the registration request, wherein the public key is stored with the subscription data. In various embodiments, the message to the authentication server initiates slice-specific authentication of the UE.

Disclosed herein is a second method for managing uplink preemption, according to embodiments of the disclosure. The second method may be performed by an AMF, such as the AMF 133, the AMF 210, and/or the network function apparatus 500. The second method includes receiving a registration request from a UE, wherein the UE registers with a mobile communication network (e.g., core network) using a first set of credentials and retrieving a public key for a network slice where slice-specific authentication is required. The second method includes encrypting a second set of credentials using the public key, the second set of credentials used for authentication with the network slice and sending a message to an authentication server, wherein the message includes the encrypted second set of credentials.

In some embodiments, the first set of credentials is received from a UDM. In such embodiments, the first set of credentials is received together with the subscription data of the UE. Here, the first set of credentials includes the public key.

In some embodiments, the second set of credentials is received from the UE. In some embodiments, encrypting the second set of credentials comprises generating a nonce, wherein the nonce is used to encrypt the second set of credentials. In such embodiments, the message to the authentication server may include the nonce.

In certain embodiments, the second method further includes checking subscription data of the UE in response to the registration request, wherein the public key is stored with the subscription data. In various embodiments, the message to the authentication server initiates slice-specific authentication of the UE.

Disclosed herein is a third apparatus for managing uplink preemption, according to embodiments of the disclosure. The third apparatus may be implemented by a UDM, such as the UDM/UDR 139, the UDM 215, and/or the network function apparatus 500. The third apparatus includes a processor that provides network exposure services to a third-party service provider, where the third-party service provider operates a slice authentication server (e.g., AAA server). The third apparatus includes a transceiver that receives a first set of credentials from the third-party service provider. Here, the first set of credentials includes a public key for a network slice where slice-specific authentication is required.

Additionally, the processor provisions the public key to an AMF as part of subscription data, wherein the subscription includes the network slice. In some embodiments, the first set of credentials is received via a NEF.

Disclosed herein is a third method for managing uplink preemption, according to embodiments of the disclosure. The third method may be performed by a UDM, such as the UDM/UDR 139, the UDM 215, and/or the network function apparatus 500. The third method includes providing network exposure services to a third-party service provider, where the third-party service provider operates a slice authentication server (e.g., AAA server). The third method includes receiving a first set of credentials from the third-party service provider. Here, the first set of credentials includes a public key for a network slice where slice-specific authentication is required.

Additionally, the third method includes provisioning the public key to an AMF as part of subscription data, wherein the subscription includes the network slice. In some embodiments, the first set of credentials is received via a NEF.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) apparatus comprising:
a processor that: registers with a mobile communication network using a first set of credentials, the mobile communication network supporting a plurality of network slices;
receives a third-party public key of a third-party authentication service provider for a network slice where slice-specific authentication is required;
encrypts a second set of credentials to conceal a user ID for the UE using a nonce generated for freshness in concealing the user ID and using the third-party public key, wherein the user ID in the second set of credentials is not decryptable except by the slice authentication server operated by the third-party service provider and is used for authentication with the network slice; and
a transceiver that sends a message to the mobile communication network, wherein the message includes the encrypted second set of credentials.

2. The apparatus of claim 1, wherein the nonce used with the third-party public key to encrypt the second set of credentials is generated by the UE.

3. The apparatus of claim 2, wherein the message to the mobile communication network includes the nonce.

4. The apparatus of claim 1, wherein the message to the mobile communication network initiates slice-specific authentication of the apparatus.

5. A method for a user-equipment (UE) comprising:
registering with a mobile communication network using a first set of credentials, the mobile communication network supporting a plurality of network slices;
receiving a third-party public key of a third-party authentication service provider for a network slice where slice-specific authentication is required;
encrypting a second set of credentials comprising a user ID for the apparatus using a nonce generated for freshness in concealing the user ID and using the public key, wherein the user ID for the UE in the second set of credentials is not decryptable except by the slice authentication server operated by the third-party service provider and is used for authentication with the network slice; and sending a message to the mobile communication network, wherein the message includes the encrypted second set of credentials.

6. A network function apparatus comprising:
a transceiver that receives a registration request from a user equipment device ("UE"), wherein the UE registers with a mobile communication network using a first set of credentials; and
a processor that: retrieves a third-party public key of a third-party authentication service provider for a network slice where slice-specific authentication is required;
encrypts a second set of credentials to conceal a user ID for the UE using a nonce generated for freshness in conceal the user ID and using the third-party public key, wherein the user ID in the second set of credentials is not decryptable except by the slice authentication server operated by the third-party service provider and is used for authentication with the network slice; and
sends a message to the slice authentication server, wherein the message includes the encrypted second set of credentials.

7. The apparatus of claim 6, wherein the first set of credentials is received from a Unified Data Management function ("UDM").

8. The apparatus of claim 7, wherein the first set of credentials is received together with subscription data of the UE.

9. The apparatus of claim 6, wherein the second set of credentials is received from the UE.

10. The apparatus of claim 6, wherein the message to the slice authentication server operated by the third-party provider includes the nonce.

11. The apparatus of claim 6, wherein the processor checks subscription data of the UE in response to the registration request, wherein the third-party public key is stored with the subscription data.

12. The apparatus of claim 6, wherein the message to the slice authentication server operated by the third-party provider initiates slice-specific authentication of the UE.

13. A network function method comprising:
receiving a registration request from a user equipment device ("UE"), wherein the UE registers with a mobile communication network using a first set of credentials;
retrieving a third-party public key of a third-party authentication service provider for a network slice where slice-specific authentication is required;

encrypting a second set of credentials for concealing a user ID of the UE using a nonce generated for freshness in concealing the user ID and using the third-party public key that is not decryptable except by the slice authentication server operated by the third-party service provider, the second set of credentials used for authentication with the network slice; and
sending a message to an authentication server, wherein the message includes the encrypted second set of credentials.

14. The method of claim 13, wherein the first set of credentials is received from a Unified Data Management function ("UDM"), wherein the first set of credentials is received together with subscription data of the UE.

15. The method of claim 13, further comprising checking subscription data of the UE in response to the registration request, wherein the third-party public key is stored with the subscription data.

16. An apparatus for a Unified Data Management function ("UDM") comprising:
a processor that provides network exposure services to a third-party service provider, the third-party service provider operating a slice authentication server; and
a transceiver that receives a first set of credentials from the third-party service provider, the first set of credentials comprising a third-party public key for a network slice where slice-specific authentication is required,
wherein the processor provisions the third-party public key that is not decryptable except by the slice authentication server operated by the third-party service provider to an Access and Mobility Management Function ("AMY") as part of subscription data, wherein the subscription includes the network slice.

17. The apparatus of claim 16, wherein the first set of credentials is received via a network exposure function ("NEF").

18. A method for a Unified Data Management ("UDM") function comprising:
providing network exposure services to a third-party service provider, the third-party service provider operating a slice authentication server;
receiving a first set of credentials from the third-party service provider, the first set of credentials comprising a third-party public key for a network slice where slice-specific authentication is required; and
provisioning the third-party public key that is not decryptable except by the slice authentication server operated by the third-party service provider to an Access and Mobility Management Function ("AMF") as part of subscription data, wherein the subscription includes the network slice.

* * * * *